US012459713B2

(12) United States Patent
Ochsmann et al.

(10) Patent No.: US 12,459,713 B2
(45) Date of Patent: Nov. 4, 2025

(54) SHEET-LIKE COMPOSITE, ESPECIALLY PACKAGING LAMINATE FOR DIMENSIONALLY STABLE FOODSTUFF CONTAINERS, HAVING A POLYMERIC INTERMEDIATE LAYER CHARACTERIZED BY DIFFERENTIAL SCANNING CALORIMETRY

(71) Applicants: SIG SERVICES AG, Neuhaugen am Rheinfall (CH); Sabine Wolters, Heinsberg (DE)

(72) Inventors: Jannis Ochsmann, Frechen (DE); Michael Wolters, Heinsberg (DE); Stefan Pelzer, Herzogenrath (DE)

(73) Assignee: SIG SERVICES AG, Neuhausen am Rheinfall (CH)

( * ) Notice: Subject to any disclaimer, the term of this patent is extended or adjusted under 35 U.S.C. 154(b) by 0 days.

(21) Appl. No.: 16/067,017

(22) PCT Filed: Dec. 21, 2016

(86) PCT No.: PCT/EP2016/082063
§ 371 (c)(1),
(2) Date: Jun. 28, 2018

(87) PCT Pub. No.: WO2017/114704
PCT Pub. Date: Jul. 6, 2017

(65) Prior Publication Data
US 2019/0009961 A1    Jan. 10, 2019

(30) Foreign Application Priority Data

Dec. 28, 2015  (DE) .......................... 102015226767.9
Jun. 7, 2016   (DE) .......................... 102016209996.5

(51) Int. Cl.
*B65D 65/40*     (2006.01)
*B32B 1/00*      (2006.01)
(Continued)

(52) U.S. Cl.
CPC ................ *B65D 65/40* (2013.01); *B32B 1/00* (2013.01); *B32B 3/266* (2013.01); *B32B 7/12* (2013.01);
(Continued)

(58) Field of Classification Search
CPC ......... B32B 27/08; B32B 3/266; B32B 27/32; B32B 15/20; B32B 27/325; B32B 27/327;
(Continued)

(56) References Cited

U.S. PATENT DOCUMENTS 4,981,760 A    1/1991  Naito et al.
5,712,006 A    1/1998  Marano et al.
(Continued)

FOREIGN PATENT DOCUMENTS

CN    103747956 A    4/2014
CN    105073421 A    11/2015
(Continued)

OTHER PUBLICATIONS

First Chinese Office Action, relating to Chinese Application No. 201680077030.X, dated Aug. 2, 2019.
(Continued)

*Primary Examiner* — Samir Shah
(74) *Attorney, Agent, or Firm* — Meunier Carlin & Curfman LLC

(57) ABSTRACT

The invention relates to a sheet-like composite including as layers of a layer sequence, in a direction from an external side of the sheet-like composite to an internal side of the sheet-like composite, a) a carrier layer, b) a polymeric intermediate layer, and c) a barrier layer, where a graph of
(Continued)

differential scanning calorimetry of the polymeric intermediate layer includes a peak A at a temperature $T_A$ and a peak B at a temperature $T_B$, where the temperature TB is more than the temperature $T_A$, where a width of the peak B is less by at least 3° C. than a width of the peak A. The invention further relates to a container precursor and to a closed container including the sheet-like composite, and also to a process by which the sheet-like composite is obtainable, and to a use of the sheet-like composite.

18 Claims, 8 Drawing Sheets

(51) Int. Cl.

| | | |
|---|---|---|
| B32B 3/26 | (2006.01) | |
| B32B 7/12 | (2006.01) | |
| B32B 15/085 | (2006.01) | |
| B32B 15/09 | (2006.01) | |
| B32B 15/12 | (2006.01) | |
| B32B 15/18 | (2006.01) | |
| B32B 15/20 | (2006.01) | |
| B32B 27/08 | (2006.01) | |
| B32B 27/10 | (2006.01) | |
| B32B 27/20 | (2006.01) | |
| B32B 27/30 | (2006.01) | |
| B32B 27/32 | (2006.01) | |
| B32B 27/34 | (2006.01) | |
| B32B 27/36 | (2006.01) | |
| B32B 29/00 | (2006.01) | |
| B32B 29/06 | (2006.01) | |
| B29C 48/21 | (2019.01) | |
| B29K 23/00 | (2006.01) | |
| B29K 601/00 | (2006.01) | |
| B29K 705/02 | (2006.01) | |
| B29L 31/00 | (2006.01) | |
| B65D 85/80 | (2006.01) | |

(52) U.S. Cl.
CPC ............ *B32B 15/085* (2013.01); *B32B 15/09* (2013.01); *B32B 15/12* (2013.01); *B32B 15/18* (2013.01); *B32B 15/20* (2013.01); *B32B 27/08* (2013.01); *B32B 27/10* (2013.01); *B32B 27/20* (2013.01); *B32B 27/306* (2013.01); *B32B 27/32* (2013.01); *B32B 27/325* (2013.01); *B32B 27/327* (2013.01); *B32B 27/34* (2013.01); *B32B 27/36* (2013.01); *B32B 29/00* (2013.01); *B32B 29/005* (2013.01); *B32B 29/06* (2013.01); *B29C 48/21* (2019.02); *B29K 2023/0633* (2013.01); *B29K 2601/00* (2013.01); *B29K 2705/02* (2013.01); *B29K 2995/0069* (2013.01); *B29L 2031/7166* (2013.01); *B32B 2255/10* (2013.01); *B32B 2255/20* (2013.01); *B32B 2255/205* (2013.01); *B32B 2264/102* (2013.01); *B32B 2264/108* (2013.01); *B32B 2270/00* (2013.01); *B32B 2307/30* (2013.01); *B32B 2307/31* (2013.01); *B32B 2307/402* (2013.01); *B32B 2307/41* (2013.01); *B32B 2307/514* (2013.01); *B32B 2307/54* (2013.01); *B32B 2307/718* (2013.01); *B32B 2307/7244* (2013.01); *B32B 2307/7265* (2013.01); *B32B 2307/748* (2013.01); *B32B 2435/00* (2013.01); *B32B 2439/40* (2013.01); *B32B 2439/62* (2013.01); *B32B 2439/70* (2013.01); *B65D 85/80* (2013.01)

(58) Field of Classification Search
CPC .......... B32B 7/12; B32B 15/18; B32B 27/10; B32B 27/34; B32B 27/36; B32B 29/00; B32B 15/09; B32B 29/06; B32B 29/005; B32B 15/085; B32B 27/306; B32B 15/12; B32B 27/20; B32B 2264/108; B32B 2307/514; B32B 2439/70; B32B 2264/102; B32B 2255/20; B32B 2435/00; B32B 2255/205; B32B 2307/732; B32B 2307/402; B32B 2439/62; B32B 2307/54; B32B 2307/30; B32B 2250/05; B32B 2307/748; B32B 2307/718; B32B 2307/7244; B32B 2270/00; B32B 2255/10

See application file for complete search history.

(56) References Cited

U.S. PATENT DOCUMENTS

| | | | |
|---|---|---|---|
| 9,902,124 | B2 | 2/2018 | Wolters et al. |
| 9,975,685 | B2 | 5/2018 | Wolters et al. |
| 2003/0228480 | A1 | 12/2003 | Bothor et al. |
| 2004/0028857 | A1* | 2/2004 | Johansson ............... B32B 27/20 |
| | | | 428/36.6 |
| 2005/0074621 | A1 | 4/2005 | Reighard et al. |
| 2009/0283256 | A1 | 11/2009 | Langeslag |
| 2012/0258228 | A1 | 10/2012 | Wolters et al. |
| 2013/0118128 | A1 | 5/2013 | Luecke et al. |
| 2013/0196102 | A1 | 8/2013 | Wolters et al. |
| 2013/0213962 | A1* | 8/2013 | Wolters ................. B65D 5/065 |
| | | | 220/62.11 |
| 2015/0225111 | A1* | 8/2015 | Duisken .................... B65B 5/06 |
| | | | 428/513 |
| 2015/0352820 | A1* | 12/2015 | Duisken ................. B32B 27/32 |
| | | | 426/127 |
| 2018/0104942 | A1* | 4/2018 | Shen ....................... B32B 5/022 |

FOREIGN PATENT DOCUMENTS

| | | |
|---|---|---|
| EP | 1144186 B1 | 10/2004 |
| EP | 1941995 A2 | 7/2008 |
| EP | 2767397 A | 8/2014 |
| JP | 02153908 A | 6/1990 |
| JP | 10237192 A | 9/1998 |
| JP | H11300913 A | 11/1999 |
| JP | 2003221024 A | 8/2003 |
| JP | 2004161349 A | 6/2004 |
| WO | 0030846 A1 | 6/2000 |
| WO | 2003095199 A1 | 11/2003 |
| WO | 2013013801 A1 | 1/2013 |
| WO | 2013013802 | 1/2013 |
| WO | 2014023393 A1 | 2/2014 |
| WO | WO2014023393 * | 2/2014 |
| WO | 2015125101 A1 | 8/2015 |
| WO | 2015186618 A1 | 12/2015 |
| WO | 2016001081 A1 | 1/2016 |
| WO | 2016005241 A1 | 1/2016 |
| WO | 2017029219 A1 | 2/2017 |
| WO | 2017072120 A1 | 5/2017 |

OTHER PUBLICATIONS

International Search Report and Written Opinion issued in related International Application No. PCT/EP2016/082063 on Apr. 28, 2017.
Office Action in connection to Japanese Application No. 2018-533750, dated Oct. 23, 2020.
Office Action in connection to EP Application No. 16 825 734.3, dated Mar. 23, 2021.
Office Action issued on Jul. 25, 2022, in European Application No. 16825734.3. 5 pages.
Third Party Observations issued on May 25, 2023, in European Patent Application No. EP16825734.3.

(56) References Cited

OTHER PUBLICATIONS

Technical Data Sheet for Ineos LDPE grade 23L430 (Apr. 2015).
Technical Data Sheet for Ineos HDPE grade HD6070FA (Feb. 2008).
Technical Data Sheets for InnoPlus LDPE grades LD2420D, LD2420F, LD2420K and LD2420H.
Micic, "Autoclave LDPE for Extrusion Coating Applications", Qenos White Paper, Jan. 2021.

* cited by examiner

100

300

400

SHEET-LIKE COMPOSITE, ESPECIALLY PACKAGING LAMINATE FOR DIMENSIONALLY STABLE FOODSTUFF CONTAINERS, HAVING A POLYMERIC INTERMEDIATE LAYER CHARACTERIZED BY DIFFERENTIAL SCANNING CALORIMETRY

The invention relates to a sheet-like composite including as layers of a layer sequence, in a direction from an external side of the sheet-like composite to an internal side of the sheet-like composite,
  a) a carrier layer,
  b) a polymeric intermediate layer, and
  c) a barrier layer,
where a graph of differential scanning calorimetry of the polymeric intermediate layer includes a peak A at a temperature $T_A$ and a peak B at a temperature $T_B$, where the temperature $T_B$ is more than the temperature $T_A$, where a width of the peak B is less by at least 3° C. than a width of the peak A. The invention further relates to a container precursor and to a closed container including the sheet-like composite, and also to a process by which the sheet-like composite is obtainable, and to a use of the sheet-like composite.

Foodstuffs, whether they be foodstuffs for human consumption or else animal food products, have for a long time been conserved by storing them either in a can or in a jar sealed with a lid. In an arrangement of this kind, one way in which the shelf life can be extended is by separately sterilizing, to the greatest degree possible, each of the foodstuff and the container—in this case, the jar or can—and then filling the container with the foodstuff and sealing it. These inherently long-established measures for extending the shelf life of foodstuffs have a series of disadvantages, however, an example being the need for a further, downstream sterilization. A disadvantage of cans and jars, arising from their substantially cylindrical form, is that very close and space-saving storage is not possible. Moreover, cans and jars have a considerable inherent weight, resulting in the increased consumption of energy for transport. Furthermore, the production of glass, tinplate or aluminium, even if the raw materials used for this purpose come from recycling, necessitates a fairly high energy expenditure. In the case of jars, a further hindering factor is a heightened expenditure for transport. The jars are usually prefabricated in a glassworks, and must then be transported, using considerable transport volumes, to the factory where foodstuff filling takes place. Jars and cans, furthermore, can be opened only with considerable application of force or with the aid of tools, and hence in a fairly inconvenient way. Another factor in the case of cans is a high risk of injury from sharp edges formed in the course of opening. In the case of jars, a continual occurrence is the entering of splinters of glass into the foodstuff during filling or during opening of the filled jars, leading possibly in a worst-case scenario to internal injuries when the foodstuff is consumed. Both cans and jars, moreover, must have labels adhered to them in order to identify and advertise the foodstuff contents. The jars and cans cannot simply be printed directly with information and advertising. In addition to the printing itself, therefore, a substrate for the printing is required, a paper or a suitable film, and also a fastening means, an adhesive agent or a sealing agent.

There are other packaging systems known in the prior art for storing foodstuffs over a long period as far as possible without detrimental effects. Such systems are containers produced from sheet-like composites—frequently also referred to as laminates. Sheet-like composites of this kind are frequently constructed from a thermoplastic plastic layer, a carrier layer consisting usually of cardboard or paper, imparting dimensional stability to the container, an adhesion promoter layer, a barrier layer, and a further plastic layer, as disclosed in WO 90/09926 A2, for instance. Since the carrier layer imparts dimensional stability to the container manufactured from the laminate, these containers have to be viewed, unlike foil pouches, as an ongoing development of the aforementioned jars and cans. The adhesion promoter layer must in this case be configured such that a permanent thermally and mechanically stable bond between the carrier layer and the barrier layer is ensured.

These laminate containers already have numerous advantages over the conventional jars and cans. Nevertheless, there are possibilities for improvement even of these packaging systems. For instance, the laminate for producing a laminate container is usually folded multiple times and certain fold regions are sealed to one another. Sealing here is accomplished by introduction of heat into the laminate, by means of hot air, for example. The laminate therefore undergoes regional heating, so that sealing can take place to polymeric layers provided for this purpose in the laminate. With the laminates of the prior art, there is a rather narrow temperature range which has to be observed for successful sealing. If the temperature of the region of laminate to be sealed becomes too high, the laminate may suffer damage, such as blistering. If, on the other hand, the temperature of the region of laminate to be sealed becomes too low, adequate seal bonding is impossible to produce.

Generally it is an object of the present invention to overcome at least partly a disadvantage arising from the prior art. A further object of the invention is to provide a packaging laminate for a dimensionally stable foodstuff container that is characterized by improved sealing properties, in particular by a larger operating window for sealing. Another object of the invention is to provide a packaging laminate for a dimensionally stable foodstuff container that is more insensitive to high-level introduction of heat during sealing. A further object of the invention is to provide a packaging laminate for a dimensionally stable foodstuff container having at least one of the aforementioned advantages, the packaging laminate being characterized by optimum adhesion between layers of the packaging laminate, in particular between the carrier layer and the barrier layer. The latter applies in particular to a packaging laminate having an aluminium barrier layer. It is an object of the present invention, furthermore, to provide a container precursor and a container composed of the aforesaid advantageous packaging laminate.

A contribution to the at least partial fulfillment of at least one of the above objects is made by the independent claims. The dependent claims provide preferred embodiments which contribute to the at least partial fulfillment of at least one of the objects.

A contribution to the fulfillment of at least one of the objects of the invention is made by an embodiment 1 of a sheet-like composite 1 including as layers of a layer sequence, in a direction from an external side of the sheet-like composite to an internal side of the sheet-like composite,
  a) a carrier layer,
  b) a polymeric intermediate layer, and
  c) a barrier layer,
where a graph of differential scanning calorimetry of the polymeric intermediate layer includes a peak A at a temperature $T_A$ and a peak B at a temperature $T_B$, where the temperature $T_B$ is more than the temperature $T_A$, where a width of the peak B is less by at least 3° C., preferably at least 5° C., more preferably at least 7° C., most preferably 8° C., than a width of the peak A. The peak A is preferably endothermic. Furthermore, the peak B is preferably endothermic.

In an embodiment 2 of the invention, the sheet-like composite 1 is configured in accordance with embodiment 1, where the temperature $T_A$ is at least 80° C., preferably at least 90° C., more preferably at least 95° C.

In an embodiment 3 of the invention, the sheet-like composite 1 is configured in accordance with embodiment 1 or 2, where the peak A is characterized by an enthalpy of fusion $H_A$, where the peak B is characterized by an enthalpy of fusion $H_B$, where a ratio of the enthalpy of fusion $H_A$ to the enthalpy of fusion $H_B$ is in a range from 1:4 to 1:0.3, preferably from 1:3 to 1:0.4, more preferably from 1:2.5 to 1:0.5.

In an embodiment 4 of the invention, the sheet-like composite 1 is configured in accordance with one of the preceding embodiments, where an absolute value of a difference between the temperature $T_B$ and the temperature $T_A$ is at least 10° C., preferably at least 15° C., more preferably at least 20° C.

In an embodiment 5 of the invention, the sheet-like composite 1 is configured in accordance with one of the preceding embodiments, where an absolute value of a difference between the temperature $T_B$ and the temperature $T_A$ is not more than 40° C., preferably not more than 35° C., more preferably not more than 30° C.

In an embodiment 6 of the invention, the sheet-like composite 1 is configured in accordance with one of the preceding embodiments, where an absolute value of a difference between an extrapolated start temperature of the peak B and an extrapolated end temperature of the peak A is in a range from 5 to 20° C., preferably from 7 to 18° C., more preferably from 9 to 15° C.

In an embodiment 7 of the invention, the sheet-like composite 1 is configured in accordance with one of the preceding embodiments, where the polymeric intermediate layer includes an HDPE in a fraction in a range from 5 to 60 wt %, preferably from 10 to 60 wt %, more preferably from 20 to 60 wt %, more preferably from 30 to 55 wt %, most preferably from 40 to 50 wt %, based on the total weight of the polymeric intermediate layer.

In an embodiment 8 of the invention, the sheet-like composite 1 is configured in accordance with one of the preceding embodiments, where the polymeric intermediate layer includes as sublayers of a sublayer sequence, in a direction from the external side of the sheet-like composite to the internal side of the sheet-like composite,
 a) a first intermediate layer; and
 b) a further intermediate layer;
where the first intermediate layer consists to an extent of 100 wt %, based on the total weight of the first intermediate layer, of an HDPE.

In an embodiment 9 of the invention, the sheet-like composite 1 is configured in accordance with one of the preceding embodiments 1 to 7, where the polymeric intermediate layer includes as sublayers of a sublayer sequence, in a direction from the external side of the sheet-like composite to the internal side of the sheet-like composite,
 a) a first intermediate layer, including
  i) an HDPE in a fraction in a range from 10 to 80 wt %, preferably from 20 to 70 wt %, more preferably from 30 to 65 wt %, most preferably 40 to 60 wt %, based on the total weight of the first intermediate layer, and
  ii) an LDPE in a fraction in a range from 20 to 90 wt %, preferably from 30 to 80 wt %, more preferably from 35 to 70 wt %, most preferably 40 to 60 wt %, based on the total weight of the first intermediate layer; and
 b) a further intermediate layer.

It is further preferred for the first intermediate layer to further include an adhesion promoter in a fraction in a range from 0.1 to 5 wt %, preferably from 0.5 to 3 wt %, more preferably from 0.5 to 2 wt %, based on the total weight of the first intermediate layer.

In an embodiment 10 of the invention, the sheet-like composite 1 is configured in accordance with embodiment 8 or 9, where the further intermediate layer includes an adhesion promoter in a fraction in a range from 20 to 100 wt %, preferably from 30 to 100 wt %, more preferably from 40 to 100 wt %, more preferably from 50 to 100 wt %, more preferably from 60 to 100 wt %, more preferably from 70 to 100 wt %, more preferably from 80 to 100 wt %, most preferably from 90 to 100 wt %, based on the total weight of the further intermediate layer.

In an embodiment 11 of the invention, the sheet-like composite 1 is configured in accordance with one of the preceding embodiments, where the sheet-like composite in the layer sequence on a side of the barrier layer that faces away from the carrier layer includes a polymeric internal layer, where a graph of a differential scanning calorimetry of the polymeric internal layer includes a peak C at a temperature $T_C$ and a peak D at a temperature $T_D$, where the temperature $T_D$ is more than the temperature $T_C$, where a width of the peak D is less by at least 3° C., preferably at least 5° C., more preferably at least 8° C., most preferably by at least 10° C., than a width of the peak C.

In an embodiment 12 of the invention, the sheet-like composite 1 is configured in accordance with embodiment 11, where the temperature $T_C$ is at least 80° C., preferably at least 90° C., more preferably at least 100° C.

In an embodiment 13 of the invention, the sheet-like composite 1 is configured in accordance with embodiment 11 or 12, where the peak C is characterized by an enthalpy of fusion $H_C$, where the peak D is characterized by an enthalpy of fusion $H_D$, where a ratio of the enthalpy of fusion $H_C$ to the enthalpy of fusion $H_D$ is in a range from 1:4 to 1:0.3, preferably from 1:3 to 1:0.4, more preferably from 1:2.5 to 1:0.55.

In an embodiment 14 of the invention, the sheet-like composite 1 is configured in accordance with one of embodiments 11 to 13, where an absolute value of a difference between the temperature $T_D$ and the temperature $T_C$ is at least 10° C., preferably at least 15° C., more preferably at least 20° C.

In an embodiment 15 of the invention, the sheet-like composite 1 is configured in accordance with one of embodiments 11 to 14, where an absolute value of a difference between the temperature $T_D$ and the temperature $T_C$ is not more than 40° C., preferably not more than 35° C., more preferably not more than 30° C.

In an embodiment 16 of the invention, the sheet-like composite 1 is configured in accordance with one of embodiments 11 to 15, where an absolute value of a difference between an extrapolated start temperature of the peak D and an extrapolated end temperature of the peak C is in a range from 3 to 15° C., preferably from 3.5 to 13° C., more preferably from 4 to 10° C.

In an embodiment 17 of the invention, the sheet-like composite 1 is configured in accordance with one of the preceding embodiments, where the carrier layer is superimposed, on a side of the carrier layer that is facing away from the barrier layer, by a polymeric external layer. Preferably, furthermore, the polymeric external layer is superimposed, on a side of the polymeric external layer that is facing away from the carrier layer, by a colour layer, preferably a decoration. The colour layer preferably includes at least one colourant.

In an embodiment 18 of the invention, the sheet-like composite 1 is configured in accordance with one of the preceding embodiments, where the barrier layer includes, and preferably consists of, one selected from the group consisting of a plastic, a metal and a metal oxide, or a combination of at least two thereof.

In an embodiment 19 of the invention, the sheet-like composite 1 is configured in accordance with one of the preceding embodiments, where the carrier layer includes, and preferably consists of, one selected from the group consisting of cardboard, paperboard and paper, or a combination of at least two thereof.

In an embodiment 20 of the invention, the sheet-like composite 1 is configured in accordance with one of the preceding embodiments, where the carrier layer has at least one hole, the hole being covered on the internal side of the sheet-like composite at least with the barrier layer, preferably additionally with the polymeric internal layer.

In an embodiment 21 of the invention, the sheet-like composite 1 is configured in accordance with one of the preceding embodiments, where an adhesion between
  a) the carrier layer and the polymeric intermediate layer, or
  b) the barrier layer and the polymeric intermediate layer, or
  c) both
is at least 0.5 N/15 mm, preferably at least 0.7 N/15 mm, more preferably at least 0.8 N/15 mm.

A contribution to fulfilling at least one of the objects of the invention is made by an embodiment 1 of a container precursor 1 including the sheet-like composite 1 according to any of embodiments 1 to 21.

In an embodiment 2 of the invention, the container precursor 1 is configured in accordance with embodiment 1, where the sheet-like composite has at least 3, preferably precisely 4, folds.

In an embodiment 3 of the invention, the container precursor 1 is configured in accordance with embodiment 1 or 2, where the sheet-like composite includes a first longitudinal edge and a further longitudinal edge, the first longitudinal edge being joined to the further longitudinal edge forming a longitudinal seam of the container precursor.

In an embodiment 4 of the invention, the container precursor 1 is configured in accordance with one of embodiments 1 to 3, where the sheet-like composite is a blank for producing an individual container.

A contribution to fulfilling at least one of the objects of the invention is made by an embodiment 1 of a closed container 1 including the sheet-like composite 1 according to any of embodiments 1 to 21.

In an embodiment 2 of the invention, the closed container 1 is configured in accordance with embodiment 1, where the sheet-like composite includes a first longitudinal edge and a further longitudinal edge, the first longitudinal edge being joined to the further longitudinal edge forming a longitudinal seam of the closed container.

In an embodiment 3 of the invention, the closed container 1 is configured in accordance with embodiment 1 or 2, where the closed container includes a foodstuff.

In an embodiment 4 of the invention, the closed container 1 is configured in accordance with one of embodiments 1 to 3, where the carrier layer has at least one hole, where the hole is covered on the internal side of the sheet-like composite at least with the barrier layer, preferably additionally with the polymeric internal layer, where the closed container includes an opening aid, where the opening aid covers the hole on the external side of the sheet-like composite.

A contribution to fulfilling at least one of the objects of the invention is made by an embodiment 1 of a process 1 including as process steps
  a) providing
    i) a carrier layer,
    ii) a barrier layer,
    iii) a first polymer composition, and
    iv) a further polymer composition;
  b) joining the barrier layer to the carrier layer by contacting
    i) the carrier layer with the first polymer composition, and
    ii) the barrier layer with the further polymer composition, thereby obtaining a sheet-like composite including as layers of a layer sequence, in a direction from an external side of the sheet-like composite to an internal side of the sheet-like composite,
      I. the carrier layer,
      II. a first intermediate layer,
      III. a further intermediate layer, and
      IV. the barrier layer;
where the first polymer composition consists to an extent of 100 wt %, based on the total weight of the first polymer composition, of an HDPE. Preferably, the carrier layer or the barrier layer or respectively both are provided as a roll in process step a).

A contribution to fulfilling at least one of the objects of the invention is made by an embodiment 1 of a process 2 including as process steps
  a) providing
    i) a carrier layer,
    ii) a barrier layer,
    iii) a first polymer composition, and
    iv) a further polymer composition;
  b) joining the barrier layer to the carrier layer by contacting
    i) the carrier layer with the first polymer composition, and
    ii) the barrier layer with the further polymer composition, thereby obtaining a sheet-like composite including as layers of a layer sequence, in a direction from an external side of the sheet-like composite to an internal side of the sheet-like composite,
      I. the carrier layer,
      II. a first intermediate layer,
      III. a further intermediate layer, and
      IV. the barrier layer;
where the first polymer composition includes
  A) an HDPE in a fraction in a range from 10 to 80 wt %, preferably from 20 to 70 wt %, more preferably from 30 to 65 wt %, most preferably 40 to 60 wt %, based on the total weight of the first polymer composition, and
  B) an LDPE in a fraction in a range from 20 to 90 wt %, preferably from 30 to 80 wt %, more preferably from 35 to 70 wt %, most preferably 40 to 60 wt %, based on the total weight of the first polymer composition.

Preferably, the carrier layer or the barrier layer or respectively both are provided as a roll in process step a). It is further preferred for the first polymer composition to further include an adhesion promoter in a fraction in a range from 0.1 to 5 wt %, preferably from 0.5 to 3 wt %, more preferably from 0.5 to 2 wt %, based on the total weight of the first polymer composition.

In an embodiment 2 of the invention, the process 1 or the process 2 is configured in each case in accordance with embodiment 1, where the first polymer composition in process step b) during contacting with the carrier layer is characterized by a melt flow index in a range from 1 to 10 g/10 min, preferably from 1 to 8 g/10 min, more preferably from 2 to 11 g/7 min, most preferably from 3 to 5 g/10 min.

In an embodiment 3 of the invention, the process 1 or the process 2 is configured in each case in accordance with embodiment 1 or 2, where the first intermediate layer is characterized by a weight per unit area in a range from 5 to 20 g/m$^2$, preferably from 7 to 18 g/m$^2$, more preferably from 10 to 15 g/m$^2$.

In an embodiment 4 of the invention, the process 1 or the process 2 is configured in each case in accordance with one of embodiments 1 to 3, where the further intermediate layer is characterized by a weight per unit area in a range from 0.5 to 10 g/m$^2$, preferably from 1 to 7 g/m$^2$, more preferably from 2 to 5 g/m$^2$.

In an embodiment 5 of the invention, the process 1 or the process 2 is configured in each case in accordance with one of embodiments 1 to 4, where the further polymer composition includes an adhesion promoter in a fraction in a range from 20 to 100 wt %, preferably from 30 to 100 wt %, more preferably from 40 to 100 wt %, more preferably from 50 to 100 wt %, more preferably from 60 to 100 wt %, more preferably from 70 to 100 wt %, more preferably from 80 to 100 wt %, most preferably from 90 to 100 wt %, based on the total weight of the further polymer composition.

In an embodiment 6 of the invention, the process 1 or the process 2 is configured in each case in accordance with one of embodiments 1 to 5, where the joining in process step b) takes the form of laminating with the first polymer composition and the further polymer composition as laminating agents. The laminating here may be configured as one selected from the group consisting of wet laminating, dry laminating and thermolaminating or as a combination of at least two thereof, with thermolaminating being preferred. The skilled person understands laminating to be a joining of two or more plies of identical or different materials by means of suitable laminating agents.

A contribution to fulfilling at least one of the objects of the invention is made by an embodiment 1 of a sheet-like composite 2 obtainable by the process 1 or the process 2 in each case in accordance with one of embodiments 1 to 6.

A contribution to fulfilling at least one of the objects of the invention is made by an embodiment 1 of a process 3 including as process steps
A. providing the sheet-like composite according to any of embodiments 1 to 21, including a first longitudinal edge and a further longitudinal edge;
B. folding the sheet-like composite; and
C. contacting and joining the first longitudinal edge to the further longitudinal edge thereby obtaining a longitudinal seam.

A contribution to fulfilling at least one of the objects of the invention is made by an embodiment 1 of a container precursor 2 obtainable by the process 3 in accordance with embodiment 1.

A contribution to fulfilling at least one of the objects of the invention is made by an embodiment 1 of a process 4 including as process steps
a. providing the container precursor 1 according to any of embodiments 1 to 4;
b. forming a base region of the container precursor by folding the sheet-like composite;
c. closing the base region;
d. filling the container precursor with a foodstuff, and
e. closing the container precursor in a top region thereby obtaining a closed container.

The closing in process step c. or e. or in both is accomplished preferably by joining regions of the sheet-like composite. A preferred joining is sealing. The closed container preferably includes no base or lid, or both, that is not formed in one piece with the sheet-like composite. Process steps b. to e. are carried out preferably in a filling machine.

In an embodiment 2 of the invention, the process 4 is configured in accordance with embodiment 1, where at least part of the sheet-like composite during the folding in process step b. has a temperature in a range from 10 to 50° C., preferably from 15 to 40° C., more preferably from 16 to 30° C., most preferably from 18 to 25° C.

In an embodiment 3 of the invention, the process 4 is configured in accordance with embodiment 1 or 2, where the closing in process step c. includes sealing, where the sealing is accomplished by contacting the sheet-like composite with a solid body having a hot temperature or with a gas having a hot temperature, or with both, where the hot temperature is in a range from 200 to 400° C., preferably from 240 to 360° C., more preferably from 260 to 340° C.

In an embodiment 4 of the invention, the process 4 is configured in accordance with one of embodiments 1 to 3, where the process further includes a process step f., where the closed container in the process step f. is joined to an opening aid. The closed container is preferably joined to the opening aid in such a way that the opening aid covers a hole in the carrier layer. A preferred opening aid is a cutting tool such as a cutting ring, for example. Preferably, furthermore, the opening aid may include a lid.

A contribution to fulfilling at least one of the objects of the invention is made by an embodiment 1 of a closed container 2 obtainable by the process 4 according to any of embodiments 1 to 4.

A contribution to fulfilling at least one of the objects of the invention is made by an embodiment 1 of a use of the sheet-like composite 1 according to any of embodiments 1 to 21 for producing a closed container filled with a foodstuff.

Features which are described as preferred in one category of the invention are also preferred in an embodiment of the other categories of the invention.

Layers

Two layers are joined to one another when their adhesion to one another goes beyond van-der-Waals forces of attraction. Layers joined to one another are preferably one selected from the group consisting of sealed to one another, bonded to one another and compressed with one another, or a combination of at least two thereof. Unless otherwise stated, the layers in a layer sequence may follow one another indirectly, i.e. with one or at least two intermediate layers, or directly, i.e. without intermediate layer. This is in particular the case with the wording in which one layer superimposes another layer. A wording in which a layer sequence includes recited layers means that at least the stated layers are present in the stated sequence. This wording does not necessarily mean that these layers follow one another directly. A wording in which two layers adjoin one another means that these two layers follow one another directly and thus without intermediate layer. This wording, however, says nothing about whether the two layers are or are not joined to one another. Instead, these two layers may be in contact with one another.

Peaks

The peaks A and B, and also the peaks C and D, may follow one another directly in the graph of the differential scanning calorimetry in accordance with the invention; they may, however, also follow one another indirectly, i.e. with one or more peaks in between. The aforementioned peaks are in each case preferably melt transitions.

Polymeric Layers

In the text below, the term "polymeric layer" refers in particular to the polymeric internal layer, the polymeric external layer and the polymeric intermediate layer, more preferably to the polymeric internal layer or the first intermediate layer or both. A preferred polymer is a polyolefin. The polymeric layers may have other constituents. The polymeric layers are applied or introduced preferably in an extrusion process into the sheet-like composite material. The further constituents of the polymeric layers are preferably constituents which do not adversely affect the behaviour of the polymer melt when applied as a layer. The further constituents may be, for example, inorganic compounds, such as metal salts, or further plastics, such as further thermoplastics. It is, however, also conceivable for the further constituents to be fillers or pigments, examples being carbon black or metal oxides. Suitable thermoplastics contemplated for the further constituents include in particular those which can be processed easily by virtue of good extrusion characteristics. Suitable among these are polymers obtained by chain polymerization, more particularly polyesters or polyolefins, where cyclic olefin copolymers (COC), polycyclic olefin copolymers (POC), more particularly polyethylene and polypropylene, are particularly preferred and polyethylene is especially preferred. Among the polyethylenes, preference is given to HDPE (high density polyethylene), MDPE (medium density polyethylene), LDPE (low density polyethylene), LLDPE (linear low density polyethylene), VLDPE (very low density polyethylene) and PE (polyethylene), and also mixtures of at least two thereof. It is also possible to use mixtures of at least two thermoplastics. Suitable polymeric layers possess a melt flow rate (MFR—melt flow rate) in a range from 1 to 25 g/10 min, preferably in a range from 2 to 20 g/10 min and more preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and more preferably in a range from 0.900 g/cm$^3$ to 0.970 g/cm$^3$. The polymeric layers preferably possess at least one melting temperature in a range from 80 to 155° C., preferably in a range from 90 to 145° C. and more preferably in a range from 95 to 135° C.

Polymeric Internal Layer

The polymeric internal layer is based on thermoplastic polymers, and the polymeric internal layer may include a particulate inorganic solid. It is preferred, however, for the polymeric internal layer to include a thermoplastic polymer to an extent of at least 70 wt %, preferably at least 80 wt % and more preferably at least 95 wt %, based in each case on the total weight of the polymeric internal layer. The polymer or polymer mixture of the polymeric internal layer preferably has a density (to ISO 1183-1:2004) in a range from 0.900 to 0.980 g/cm$^2$, particularly preferred in a range from 0.900 to 0.960 g/cm$^3$ and most preferably in a range from 0.900 to 0.940 g/cm$^2$.

Carrier Layer

Material used as carrier layer may be any material suitable to the skilled person for this purpose and having sufficient strength and stiffness to provide the container with sufficient stability that the container substantially retains its shape in the filled state. This is in particular a necessary feature of the carrier layer, since the invention pertains to the technical field of dimensionally stable containers. Aside from a series of plastics, preference is given to plant-based fibre materials, more particularly chemical pulps, preferably glued, bleached and/or unbleached chemical pulps, with paper and cardboard being particularly preferred. The weight per unit area of the carrier layer is preferably in a range from 120 to 450 g/m$^2$, more preferably in a range from 130 to 400 g/m$^2$ and most preferably in a range from 150 to 380 g/m$^2$. A preferred cardboard generally has a single-layer or multilayer construction and may have been coated on one or both sides with one or else two or more outer layers. Furthermore, a preferred cardboard possesses a residual moisture content of less than 20 wt %, preferably of 2 to 15 wt % and more preferably of 4 to 10 wt %, based on the total weight of the cardboard. A particularly preferred cardboard has a multilayer construction. Preferably, moreover, on the surface facing the surroundings, the cardboard has at least one, but more preferably at least two, plies of an outer layer known to the skilled person as a "paper coating". Furthermore, a preferred cardboard possesses a Scott Bond value in a range from 100 to 360 J/m$^2$, preferably from 120 to 350 J/m$^2$ and especially preferably from 135 to 310 J/m$^2$. By virtue of the ranges specified above, success is achieved in providing a composite from which it is easily possible, within narrow tolerances, to fold a highly leaktight container.

Barrier Layer

Material used as barrier layer may be any material suitable to the skilled person for this purpose and having a sufficient barrier effect, especially with regard to oxygen. The barrier layer is preferably selected from a. a plastics barrier layer;
 b. a metal layer;
 c. a metal oxide layer; or
 d. a combination of at least two from a. to c.

If, according to alternative a., the barrier layer is a plastics barrier layer, it includes preferably at least 70 wt %, more preferably at least 80 wt % and most preferably at least 95 wt % of at least one plastic which is known to the skilled person for this purpose especially on account of aroma-barrier and/or gas-barrier properties that are suitable for packaging containers. Plastics, especially thermoplastics, contemplated here are N-carrying or O-carrying plastics, either individually or in mixtures of two or more. In accordance with the invention, it may prove to be advantageous if the plastics barrier layer possesses a melting temperature in a range from more than 155 to 300° C., preferably in a range from 160 to 280° C. and more preferably in a range from 170 to 270° C.

With further preference the plastics barrier layer has a weight per unit area in a range from 2 to 120 g/m$^2$, preferably in a range from 3 to 60 g/m$^2$, more preferably in a range from 4 to 40 g/m$^2$ and, moreover, preferably from 6 to 30 g/m$^2$. Preferably, furthermore, the plastics barrier layer is obtainable from melts, as for example by extrusion, more particularly layer extrusion. Preferably, furthermore, the plastics barrier layer may also be introduced into the sheet-like composite by way of lamination. In that case it is preferred for a foil to be incorporated into the sheet-like composite. According to another embodiment, plastics barrier layers selected may also include layers obtainable by deposition from a solution or dispersion of plastics.

Suitable polymers in question are preferably those which have a molecular weight with a weight average, determined by gel permeation chromatography (GPC) by means of light scattering, in a range from $3 \times 10^3$ to $1 \cdot 10^7$ g/mol, preferably in a range from $5 \cdot 10^3$ to $1 \cdot 10^6$ g/mol and more preferably in a range from $6 \cdot 10^3$ to $1 \cdot 10^5$ g/mol. Suitable polymers contemplated include, in particular, polyamide (PA) or polyethylene-vinyl alcohol (EVOH) or a mixture thereof.

Among the polyamides, those suitable are all PAs that appear to the skilled person to be suitable for use in accordance with the invention. Mention should be made here particularly of PA 6, PA 6.6, PA 6.10, PA 6.12, PA 11 or PA 12 or a mixture of at least two thereof, with PA 6 and PA 6.6 being particularly preferred and PA 6 being further preferred. PA 6 is available commercially for example under the trade names Akulon®, Durethan® and Ultramid®. Additionally suitable are amorphous polyamides such as, for example, MXD6, Grivory® and Selar® PA. It is further preferred for the PA to have a density in a range from 1.01 to 1.40 g/cm³, preferably in a range from 1.05 to 1.30 g/cm³ and more preferably in a range from 1.08 to 1.25 g/cm³. It is preferred, moreover, for the PA to have a viscosity number in a range from 130 to 185 ml/g and preferably in a range from 140 to 180 ml/g.

EVOH contemplated includes all EVOHs that appear to the skilled person to be suitable for use in accordance with the invention. Examples thereof are available commercially, among others, under the trade names EVAL™ from EVAL Europe NV, Belgium, in a plurality of different versions, examples being the grades EVAL™ F104B or EVAL™ LR171B. Preferred EVOHs possess at least one, two, a plurality or all of the following properties:
- an ethylene content in a range from 20 to 60 mol %, preferably from 25 to 45 mol %;
- a density in a range from 1.0 to 1.4 g/cm³, preferably from 1.1 to 1.3 g/cm³;
- a melting point in a range from more than 155 to 235° C., preferably from 165 to 225° C.;
- an MFR (210° C./2.16 kg if $T_{M(EVOH)}$<230° C.; 230° C./2.16 kg if 210° C.<$T_{M(EVOH)}$<230° C.) in a range from 1 to 25 g/10 min, preferably from 2 to 20 g/10 min;
- an oxygen permeation rate in a range from 0.05 to 3.2 cm³·20 µm/m²·day·atm, preferably in a range from 0.1 to 1 cm³·20 µm/m²·day·atm.

Preferably, at least one polymeric layer, more preferably the polymeric internal layer, or, preferably, all the polymeric layers, has or have a melting temperature below the melting temperature of the barrier layer. This is especially the case if the barrier layer is formed of polymer. The melting temperatures of the at least one, more particularly the polymeric internal layer, and the melting temperature of the barrier layer here differ preferably by at least 1 K, more preferably by at least 10 K, even more preferably by at least 50 K, and with further preference at least 100 K. The temperature difference ought preferably to be selected to be only such that there is no melting of the barrier layer, more particularly no melting of the plastics barrier layer, during folding.

According to alternative b., the barrier layer is a metal layer. Suitable metal layers are in principle all layers with metals that are known to the skilled person and are able to provide high opacity and oxygen-impermeability. According to one preferred embodiment, the metal layer may be present in the form of a foil or of a deposited layer, by physical vapour deposition, for example. The metal layer is preferably an uninterrupted layer. According to another preferred embodiment, the metal layer has a thickness in a range from 3 to 20 µm, preferably in a range from 3.5 to 12 µm and more preferably in a range from 4 to 10 µm.

Metals preferably selected are aluminium, iron or copper. A preferred iron layer may be a steel layer, in the form of a foil, for example. With further preference, the metal layer is a layer with aluminium. The aluminium layer may consist judiciously of an aluminium alloy, as for example AlFeMn, AlFe1.5Mn, AlFeSi or AlFeSiMn. The purity is customarily 97.5% or more, preferably 98.5% or more, based in each case on the overall aluminium layer. In one particular configuration, the metal layer consists of an aluminium foil. Suitable aluminium foils possess a stretchability of more than 1%, preferably of more than 1.3% and more preferably of more than 1.5%, and a tensile strength of more than 30 N/mm², preferably more than 40 N/mm² and particularly preferably more than 50 N/mm². Suitable aluminium foils exhibit a droplet size in the pipette test of more than 3 mm, preferably more than 4 mm and particularly preferably of more than 5 mm. Suitable alloys for producing aluminium layers or aluminium foils are available commercially under the designations EN AW 1200, EN AW 8079 or EN AW 8111 from Hydro Aluminium Deutschland GmbH or Amcor Flexibles Singen GmbH. In the case of a metal foil as barrier layer, an adhesion promoter layer between the metal foil and the closest polymeric layer may be provided on one and/or both sides of the metal foil.

It is possible with preference, moreover, in accordance with alternative c., for a metal oxide layer to be selected as barrier layer. Metal oxide layers contemplated include all metal oxide layers which to the skilled person are familiar and appear suitable for achieving a barrier effect with respect to light, vapour and/or gas. Especially preferred are metal oxide layers based on the aforementioned metals aluminium, iron or copper, and also metal oxide layers based on titanium- or silicon oxide compounds. A metal oxide layer is generated, by way of example, by vapour deposition of metal oxide on a plastics layer, as for example an oriented polypropylene film. A preferred method for this is that of physical vapour deposition.

According to another preferred embodiment, the metal layer or the metal oxide layer may be present as a layer composite composed of one or more plastics layers with a metal layer. A layer of this kind is obtainable for example by vapour deposition of metal on a plastics layer, as for example an oriented polypropylene film. A preferred method for this purpose is that of physical vapour deposition.

External Surface

The external surface of the sheet-like composite is a surface of a ply of the sheet-like composite which, in a container to be produced from the sheet-like composite, is intended to be in contact with the surroundings of the container. This holds also if, in individual regions of the container, external surfaces of different regions of the composite are folded onto one another or joined to one another, being, for example, sealed to one another.

Internal Surface

The internal surface of the sheet-like composite is a surface of a ply of the sheet-like composite which is intended, in a container to be produced from the sheet-like composite, to lie in contact with the contents of the container, preferably with a foodstuff.

Adhesion/Adhesion Promoter Layer

An adhesion promoter layer may be located between layers which do not directly adjoin one another, preferably between the barrier layer and the polymeric internal layer. Adhesion promoters contemplated in an adhesion promoter layer include all plastics which by virtue of functionalization by means of suitable functional groups are suitable for producing a secure bond through the formation of ionic bonds or covalent bonds to a surface of a respectively adjacent layer. These are, preferably, functionalized polyolefins obtained by copolymerization of ethylene with acrylic acids such as acrylic acid, methacrylic acid, crotonic acid, acrylates, acrylate derivatives or carboxylic anhydrides which carry double bonds, an example being maleic anhydride, or at least two thereof. Preferred among these are polyethylene-maleic anhydride graft polymers (EMAH), ethylene-acrylic acid copolymers (EAA) or ethylene-methacrylic acid copolymers (EMAA), which are sold for example under the trade names Bynel® and Nucrel® 0609HSA by DuPont, or Escor® 6000ExCo by ExxonMobil Chemicals.

In accordance with the invention it is preferred for the adhesion between a carrier layer, a polymeric layer or a barrier layer and the respectively closest layer to be at least 0.5 N/15 mm, preferably at least 0.7 N/15 mm and particularly preferably at least 0.8 N/15 mm. In one configuration of the invention it is preferred for the adhesion between a polymeric layer and a carrier layer to be at least 0.3 N/15 mm, preferably at least 0.5 N/15 mm and particularly preferably at least 0.7 N/15 mm. It is preferred, furthermore, for the adhesion between a barrier layer and a polymeric layer to be at least 0.8 N/15 mm, preferably at least 1.0 N/15 mm and particularly preferably at least 1.4 N/15 mm. Where a barrier layer follows a polymeric layer indirectly, via an adhesion promoter layer, it is preferred for the adhesion between the barrier layer and the adhesion promoter layer to be at least 1.8 N/15 mm, preferably at least 2.2 N/15 mm and particularly preferably at least 2.8 N/15 mm. In one particular configuration, the adhesion between the individual layers is sufficiently strong that in the adhesion test a carrier layer is torn apart—a cardboard fibre tear in the case of cardboard as carrier layer.

Adhesion Promoter

Useful adhesion promoters in the polymeric intermediate layer, more particularly in the further intermediate layer, include all polymers which are suitable for producing a firm bond through functionalization by means of suitable functional groups, through the forming of ionic bonds or covalent bonds with a surface of a respectively adjacent layer. Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel® 0609HSA trade names by DuPont, or Escor® 6000ExCo by ExxonMobil Chemicals. The first intermediate layer and the further intermediate layer preferably include the same adhesion promoter.

Polyolefin

A preferred polyolefin is a polyethylene (PE) or a polypropylene (PP) or both. A preferred polyethylene is one selected from the group consisting of an LDPE, an LLDPE and an HDPE, or a combination of at least two thereof. Another preferred polyolefin is a m-polyolefin (polyolefin prepared using a metallocene catalyst). Suitable polyethylenes possess a melt flow rate (MFI—melt flow index=MFR—melt flow rate) in a range from 1 to 25 g/10 min, preferably in a range from 2 to 20 g/10 min and particularly preferably in a range from 2.5 to 15 g/10 min, and a density in a range from 0.910 g/cm$^3$ to 0.935 g/cm$^3$, preferably in a range from 0.912 g/cm$^3$ to 0.932 g/cm$^3$, and further preferably in a range from 0.915 g/cm$^3$ to 0.930 g/cm$^3$.

m-Polymer

An m-polymer is a polymer prepared using a metallocene catalyst. A metallocene is an organometallic compound in which a central metal atom is disposed between two organic ligands, such as cyclopentadienyl ligands, for example. A preferred m-polymer is an m-polyolefin, preferably an m-polyethylene or an m-polypropylene or both. A preferred m-polyethylene is one selected from the group consisting of an mLDPE, an mLLDPE and an mHDPE, or a combination of at least two thereof.

Extruding

In the extrusion, the polymers are heated customarily to temperatures of 210 to 350° C., measured on the melted polymer film below the exit on the extruder die. Extrusion may be accomplished by means of commercially available extrusion tools known to the skilled person, such as, for example, extruders, extruder screws, feedblock, etc. Located at the end of the extruder preferably is an opening through which the polymer melt is pressed. The opening may have any shape allowing the polymer melt to be extruded onto the composite precursor. For example, the opening may be angular, oval or circular. The opening preferably has the shape of a slot of a funnel. In one preferred embodiment of the process, application takes place through a slot. The slot preferably has a length in a range from 0.1 to 100 m, preferably in a range from 0.5 to 50 m, particularly preferably in a range from 1 to 10 m. Moreover, the slot preferably has a width in a range from 0.1 to 20 mm, preferably in a range from 0.3 to 10 mm, particularly preferably in a range from 0.5 to 5 mm. During the application of the polymer melt it is preferred for the slot and the composite precursor to move relative to one another. A preferred process is therefore one in which the composite precursor moves relative to the slot.

In the case of a preferred extrusion coating operation, the polymer melt is stretched during application, this stretching being accomplished preferably by melt stretching, very preferably by monoaxial melt stretching. For this purpose the layer is applied in a melted state to the composite precursor, using a melt extruder, and the applied layer, still in the melted state, is subsequently stretched in preferably monoaxial direction in order to achieve orientation of the polymer in this direction. The applied layer is subsequently cooled for heat-setting. It is particularly preferred in this context for the stretching to take place by at least the following application steps:

b1. emergence of the polymer melt as a melt film via at least one extruder die slot at an emergence velocity $V_{eme}$;

b2. application of the melt film to the composite precursor moving relative to the at least one extruder die slot at a movement velocity $V_{pre}$;

where $V_{eme} < V_{pre}$. With more particular preference, $V_{pre}$ is greater than $V_{eme}$ by a factor in the range from 5 to 200, particularly preferably in a range from 7 to 150, with further preference in a range from 10 to 50 and most preferably in a range from 15 to 35. It is preferred here for $V_{pre}$ to be at least 100 m/min, particularly preferably at least 200 m/min and very preferably at least 350 m/min, but customarily not more than 1300 m/min. When the melt layer has been applied to the composite precursor by means of the stretching process described above, the melt layer can be cooled for the purpose of heat-setting, and this cooling is accomplished preferably by quenching through contact with a surface which is maintained at a temperature in a range from 5 to 50° C., more preferably in a range from 10 to 30° C.

In accordance with a further preferred configuration, the area which has emerged is cooled down to a temperature below the lowest melting temperature of the polymers provided in this area or its flanks, and then at least the flanks of the area are separated from this area. Cooling may be carried out in any way which is familiar to the skilled person and appears to be suitable. Preference is given here as well to the heat-setting already described above. Subsequently at least the flanks are separated from the area. Separation may be carried out in any way which is familiar to the skilled person and appears suitable. Separation is accomplished preferably by knife, laser beam or water jet, or a combination of two or more thereof, the use of knives being particularly preferred, especially knives for shearing.

Foodstuff

The present sheet-like composite and also the container precursor are preferably designed for producing a foodstuff container. Furthermore, the closed container of the invention is preferably a foodstuff container. Foodstuffs contemplated include all of the foodstuffs known to the skilled person for human consumption, and also animal feeds. Preferred foodstuffs are liquid above 5° C., examples being milk products, soups, sauces and non-carbonated drinks.

Colourants

Colourant according to DIN 55943:2001-10 is the collective designation for all colouring substances, more particularly for dyes and pigments. A preferred colourant is a pigment. A preferred pigment is an organic pigment. Pigments significant in the context of the invention are especially those pigments mentioned in DIN 55943:2001-10 and in "Industrial Organic Pigments, Third Edition." (Willy Herbst, Klaus Hunger Copyright 0 2004 WILEY-VCH Verlag GmbH & Co. KGaA, Weinheim ISBN: 3-527-30576-9).

Container

The closed container of the invention may have a multitude of different forms, but is preferably a substantially cuboidal structure. Furthermore, the container may be formed over its full area from the sheet-like composite, or may have a two-part or multi-part construction. In the case of a multi-part construction, it is conceivable for other materials to be employed as well as the sheet-like composite, examples being plastics, which may be employed in particular in the top or base regions of the container. In that case, however, it is preferred for the container to be constructed to an extent of at least 50%, more preferably at least 70% and with further preference at least 90% of its area from the sheet-like composite. The container, moreover, may have a device allowing the contents to be emptied. This device may be formed from plastic, for example, and applied on the external side of the container. It is also possible for this device to be integrated into the container by means of direct injection moulding. According to one preferred configuration, the container of the invention has at least one, preferably from 4 to 22 or else more edges, more preferably from 7 to 12 edges. An edge in the context of the present invention refers to regions which are formed when a surface is folded.

Illustrative edges include the elongate regions of contact between two wall surfaces of the container, and are also referred to herein as longitudinal edges. In the container, the container walls preferably represent the surfaces of the container that are framed by the edges. The interior of a container of the invention preferably contains a foodstuff. The closed container preferably does not include a lid or base, or both, that is not formed in one piece with the sheet-like composite. A preferred closed container contains a foodstuff.

Measurement Methods

The following measurement methods were utilized for the purposes of the invention. Unless otherwise indicated, the measurements were conducted at an ambient temperature of 25° C., an ambient air pressure of 100 kPa (0.986 atm) and a relative atmospheric humidity of 50%.

MFR

The MFR is measured according to standard ISO 1133 (unless otherwise stated, at 190° C. and 2.16 kg).

Density

The density is measured according to standard ISO 1183-1.

Melting Temperature

The melting temperature is determined using the DSC method of ISO 11357-1,-5. Instrument calibration takes place according to manufacturer instructions, using the following measurements:

temperature of indium—onset temperature,
heat of fusion indium,
temperature of zinc—onset temperature.

Oxygen Permeation Rate

The oxygen permeation rate is determined according to standard ISO 14663-2 Annex C at 20° C. and 65% relative humidity.

Moisture Content of the Cardboard

The moisture content of the cardboard is measured according to standard ISO 287:2009.

Detection of Colourants

Organic colourants may be detected in accordance with methods described in "Industrial Organic Pigments, Third Edition." (Willy Herbst, Klaus Hunger Copyright 0 2004 WILEY-VCH Verlag GmbH & Co. KGaA, Weinheim ISBN: 3-527-30576-9).

Adhesion

The adhesion of two adjacent layers is determined by fixing them on a rotatable roller on a 90° peel test device, an example being German rotating wheel fixture from Instron, said roller rotating at 40 mm/min during measurement. The samples were cut beforehand into strips 15 mm wide. On one side of the sample, the plies are parted from one another and the detached end is clamped into a tensile device directed vertically upward. Mounted on the tensile device is a measuring instrument for determining the tensile force. As the roller rotates, a measurement is made of the force required to separate the plies from one another. This force corresponds to the adhesion of the layers to one another and is reported in N/15 mm.

Sample Preparation for Differential Scanning Calorimetry (DSC)

The sample sections are cut from the laminate (5 cm×5 cm). Then the samples are separated in the region of the carrier material, after which the laminating layer, the barrier layer and the internal layer are treated in a bath of 30% strength acetic acid for 30 minutes at 60° C. After that it is possible to separate the barrier layer from the laminating layer and the internal layer without destruction. The laminating layer is subsequently treated for 10 minutes in 50% strength sodium hydroxide solution at room temperature. Thereafter, residues of the carrier layer are mechanically removed. The samples are subsequently rinsed with distilled water and dried. The resulting individualized laminating layer and internal layer films are then amenable after drying to measurement by differential scanning calorimetry.

Differential Scanning Calorimetry (DSC)

The differential scanning calorimetry is carried out according to standard DIN EN ISO 11357-1:2010-03. In this method, the heat flow is measured as a function of the temperature. The graph of the measurement therefore shows the heat flow (dQ/dt) on the ordinate axis as a function of the temperature (T) on the abscissa axis. The endothermic direction is always upwards, as in note to section 3.1 of DIN EN ISO 11357-1:2010-03. According to section 4.2 of standard DIN EN ISO 11357-1:2010-03, a heat flow differential calorimetry is carried out. In this case, the reference crucible is always empty and, according to section 3.10 of DIN EN ISO 11357-1:2010-03, the reference position is always used for the temperature. The flushing gas used (sections 5.5 and 9.1.2 of DIN EN ISO 11357-1:2010-03) is nitrogen. Prior to each measurement, the DSC instrument is calibrated according to sections 8.2 to 8.4 of DIN EN ISO 11357-1:2010-03 using the calibrating substances (section 3.2 and 5.4 of DIN EN ISO 11357-1:2010-03) indium and zinc (as per annex C of DIN EN ISO 11357-1:2010-03). As recommended in 8.4.2 of DIN EN ISO 11357-1:2010-03, the heat calibration is carried out using indium as calibrating substance. The measurements are carried out in dynamic mode (3.9.5 of DIN EN ISO 11357-1:2010-03). In this case the sample is typically pretreated by first heating from 30° C. to 160° C. at 10° C./min and maintaining the temperature for 10 minutes. Thereafter the sample is cooled to 30° C. at 5° C./min. After that the measurement process is carried out with a heating rate of 10° C./min up to 160° C. For the evaluation of the measurement, only the second heating curve described above is used.

The term "peak" as used herein can be equated with the same term used in DIN EN ISO 11357-1:2010-03. Accordingly, the definition in section 3.9 of the standard is also valid. The peaks A and B for the polymeric internal layer are situated typically in a range from 50° C. to 135° C., and for the further polymeric layer, which is preferably a laminating layer, in a range from 80° C. to 132° C. The enthalpy of fusion (wording of the standard: "peak area") of a peak is equivalent to the area enclosed by the virtual interpolated baseline (as per section 3.7.3 of DIN EN ISO 11357-1:2010-03) of the peak and the DSC graph from the extrapolated start temperature up to the extrapolated end temperature of the peak.

For the terms "extrapolated start temperature and extrapolated end temperature" used herein, DIN EN ISO 11357-1:2010-03 uses the terms "interpolated or extrapolated starting temperature" and "interpolated or extrapolated end temperature", which can therefore be equated with these terms as far as their content is concerned. The definitions of the extrapolated temperatures (wording of the standard: "interpolated or extrapolated" temperatures) are given on page 11 of DIN EN ISO 11357-1:2010-03. For this purpose, tangents are used as auxiliary lines.

The width of a peak as used herein is equal to the difference between the extrapolated end temperature of this peak and its extrapolated start temperature. This definition deviates from the definition given in section 3.9.5 of DIN EN ISO 11357-1:2010-03, since the extrapolated temperatures are used herein. Furthermore, the standard defines the height of a peak as peak height (3.9.4). This definition is also valid here.

Leaktightness

The test medium used for the leaktightness test is Kristalloel 60 from Shell Chemicals with methylene blue. For this test, 250 containers were produced from the test laminate as described below for the inventive and comparative examples, and were filled with water and closed. The closed containers are subsequently cut along their periphery in each case in such a way as to obtain a container part open at the top and including the closed base region. This container part is filled with approximately 20 ml of the test medium and stored for 24 hours. After intervals of one, three and 24 hours, the container parts are inspected with the naked eye on the external side of the base region to ascertain whether the test medium there has generated—in the case of leakage of the base region—blue discolorations.

The invention is set out in more accurate form below, by means of examples and drawings, the examples and drawings not implying any restriction of the invention. Unless otherwise indicated, moreover, the drawings are not to scale.

For the examples, laminates with the following layer construction and layer sequence were produced by means of a layer extrusion process.

| Layer designation | Composition | Weight per unit area [g/m$^2$] |
|---|---|---|
| Polymeric external layer | LDPE 19N430 from Ineos GmbH, Germany (Ineos) | 15 |
| Carrier layer | Cardboard: Stora Enso Natura T Duplex double-coated, Scott-Bond 200 J/m$^2$, residual moisture content 7.5% | 240 |
| Laminating layer | Blend: 65 wt % LDPE 19N430 from Ineos, 26 wt % HDPE Eltex ® HD6070 from Ineos, 9 wt % M21L430 from Ineos | 18 |
| Barrier layer | Aluminium, EN AW 8079 from Hydro Aluminium Deutschland GmbH | here thickness 6 μm |
| Polymeric internal layer | Blend: 90 wt % LDPE 19N430 from Ineos, 10 wt % mPE Affinity ® PT 1451 from Dow Chemicals, Germany | |

| Hot air temperature [° C.] | Leaked containers 0 to 1 h | Leaked containers 1 to 3 h | Leaked containers 3 to 24 h | Leaked containers 0 to 24 h |
|---|---|---|---|---|
| 280 | 0 | 0 | 0 | 0 |
| 290 | 0 | 0 | 0 | 0 |
| 300 | 0 | 0 | 0 | 0 |
| 310 | 0 | 0 | 0 | 0 |
| 320 | 0 | 0 | 0 | 0 |
| 330 | 0 | 0 | 0 | 0 |
| 340 | 0 | 0 | 0 | 0 |

For the following further inventive examples and comparative (non-inventive) examples, laminates with the following layer construction and layer sequence were produced by means of a layer extrusion process.

| Layer designation | Material | Weight per unit area [g/m²] |
|---|---|---|
| Polymeric external layer | LDPE 19N430 from Ineos GmbH, Germany (Ineos) | 15 |
| Carrier layer | Cardboard: Stora Enso Natura T Duplex double-coated, Scott-Bond 200 J/m², residual moisture content 7.5% | 240 |
| Laminating layer | see below | |
| Barrier layer | Aluminium, EN AW 8079 from Hydro Aluminium Deutschland GmbH | here thickness 6 μm |
| Polymeric internal layer | 100 wt % LDPE 23L430 from Ineos | 12 |
| | Blend: 70 wt % LDPE 23L430 from Ineos, 30 wt % mPE Affinity ® from Dow | 20 |

Production of Laminate

The laminate is produced on an extrusion coating line (ER-WE-PA GmbH, Erkrath, Germany) comprising extruder, extruder screw, feed block and die. In the first step, the polymeric external layer is applied to the carrier layer on the extrusion coating line. In the second step, the laminating layer is applied together with the barrier layer to the carrier layer coated beforehand with the polymeric external layer. In the last step, the polymeric internal layer is applied to the carrier material. For the application of the individual layer, the polymers or polymer blends are melted in an extruder, where they are heated to temperatures of 210° C. to 340° C. When a polymer or polymer blend is applied in a layer, the melt produced is transferred via a feedblock to a die. When two or more polymers or polymer blends are applied in one layer, the melts produced are combined using a feedblock and transferred to the die. The melt leaves the die through the die gap (length 500 mm, width 1 mm) and is applied to the carrier layer, which is moving relative to the die gap.

The different laminating layers in the further inventive and comparative examples were subjected using the measurement method described above to differential scanning calorimetry, with sample preparation taking place likewise as described above. Tables below show, for the respective inventive and comparative examples, the extreme points of measured peaks A and B, i.e. temperatures $T_A$ and $T_B$, and also the widths of the peaks A and B.

Each of the laminates was folded and sealed to produce cuboidal containers (brick type). First of all, customary jacket-like container precursors were produced by sealing of a longitudinal seam. These precursors were conveyed to a commercial filling machine. In this machine, a base region of the container was generated by folding, and was sealed by being blown with hot air. The respective hot air temperature is indicated below. Further, the containers were filled with water and, by means of further folding, a top region was generated and was closed by means of ultrasonic sealing. Further, the containers thus produced were subjected to the leaktightness test described above. The tables below show the number of containers visibly leaking from the outside, for the test periods of 0 to 1 hour, 1 to 3 hours and 3 to 24 hours, and also the total thereof for the inventive and comparative examples.

Comparative Examples A (not Inventive)

| Laminating layer | | | | | |
|---|---|---|---|---|---|
| Sublayers and composition | Weight per unit area [g/m²] | $T_A$ [° C.] | $T_B$ [° C.] | Width of peak A [° C.] | Width of peak B [° C.] |
| 100 wt % PP Daploy ® SF313HMS from Borealis | 8 | 110 | 160 | 10 | 15 |
| Blend: 40 wt % PP Daploy ® SF313HMS from Borealis, 60 wt % LDPE 23L430 from Ineos | 12 | | | | |

| Hot air temperature [° C.] | Leaked containers 0 to 1 h | Leaked containers 1 to 3 h | Leaked containers 3 to 24 h | Leaked containers 0 to 24 h |
|---|---|---|---|---|
| 280 | 7 | 5 | 8 | 20 |
| 290 | 3 | 4 | 4 | 11 |
| 300 | 0 | 1 | 1 | 2 |
| 310 | 0 | 0 | 0 | 0 |
| 320 | 0 | 0 | 0 | 0 |
| 330 | 0 | 0 | 0 | 0 |

Comparative Examples B (not Inventive)

| Laminating layer | | | | | |
|---|---|---|---|---|---|
| Sublayers and composition | Weight per unit area [g/m²] | $T_A$ [° C.] | $T_B$ [° C.] | Width of peak A [° C.] | Width of peak B [° C.] |
| 100 wt % EMAA Nucrel ® 0609 from DuPont | 21 | 95 | 103 | 5 | 6 |
| Blend: 70 wt % LDPE 19N430 from Ineos, 30 wt % mPE Affinity ® PT 1451 from Dow | 9 | | | | |

| Hot air temperature [° C.] | Leaked containers 0 to 1 h | Leaked containers 1 to 3 h | Leaked containers 3 to 24 h | Leaked containers 0 to 24 h |
|---|---|---|---|---|
| 280 | 0 | 0 | 0 | 0 |
| 290 | 0 | 0 | 0 | 0 |
| 300 | 0 | 0 | 0 | 0 |
| 310 | 0 | 1 | 1 | 2 |
| 320 | 3 | 5 | 4 | 12 |
| 330 | 6 | 8 | 7 | 21 |

Comparative Examples C (not Inventive)

Laminating layer

| Sublayers and composition | Weight per unit area [g/m²] | $T_A$ [°C.] | $T_B$ [°C.] | Width of peak A [°C.] | Width of peak B [°C.] |
|---|---|---|---|---|---|
| 100 wt % LDPE 23L430 from Ineos | 12 | 105 | / | 17 | / |
| Blend: 70 wt % LDPE 23L430 from Ineos, 30 wt % mPE Affinity ® from Dow | 20 | | | | |

| Hot air temperature [°C.] | Leaked containers 0 to 1 h | Leaked containers 1 to 3 h | Leaked containers 3 to 24 h | Leaked containers 0 to 24 h |
|---|---|---|---|---|
| 280 | 3 | 5 | 4 | 12 |
| 290 | 0 | 0 | 0 | 0 |
| 300 | 0 | 1 | 0 | 1 |
| 310 | 0 | 0 | 0 | 0 |
| 320 | 0 | 0 | 1 | 1 |
| 330 | 0 | 2 | 2 | 4 |
| 340 | 5 | 4 | 3 | 12 |

Inventive Examples 1

Laminating layer

| Sublayers and composition | Weight per unit area [g/m²] | $T_A$ [°C.] | $T_B$ [°C.] | Width of peak A [°C.] | Width of peak B [°C.] |
|---|---|---|---|---|---|
| 100 wt % HDPE Rigidex ® HD6070 from Ineos | 6.5 | 105 | 126 | 20 | 8 |
| 100 wt % LDPE from Ineos, 19N430 | 11 | | | | |
| Blend: 70 wt % LDPE 19N430 from Ineos, 30 wt % mPE Affinity ® 1451 from Dow | 7.5 | | | | |

| Hot air temperature [°C.] | Leaked containers 0 to 1 h | Leaked containers 1 to 3 h | Leaked containers 3 to 24 h | Leaked containers 0 to 24 h |
|---|---|---|---|---|
| 280 | 0 | 0 | 0 | 0 |
| 290 | 0 | 0 | 0 | 0 |
| 300 | 0 | 0 | 0 | 0 |
| 310 | 0 | 0 | 0 | 0 |
| 320 | 0 | 0 | 0 | 0 |
| 330 | 0 | 0 | 0 | 0 |
| 340 | 0 | 0 | 0 | 0 |

Inventive Examples 2

Laminating layer

| Sublayers and composition | Weight per unit area [g/m²] | $T_A$ [°C.] | $T_B$ [°C.] | Width of peak A [°C.] | Width of peak B [°C.] |
|---|---|---|---|---|---|
| Blend: 75 wt % HDPE Rigidex ® HD6070FA from Ineos, 25 wt % LDPE 23L430 from Ineos | 6.8 | 105 | 130 | 20 | 12 |
| 100 wt % LDPE 23L430 from Ineos | 11.95 | | | | |
| Blend: 60 wt % LDPE 23L430 from Ineos, 40 wt % mPE Affinity ® from Dow | 11.25 | | | | |

| Hot air temperature [°C.] | Leaked containers 0 to 1 h | Leaked containers 1 to 3 h | Leaked containers 3 to 24 h | Leaked containers 0 to 24 h |
|---|---|---|---|---|
| 280 | 0 | 0 | 0 | 0 |
| 290 | 0 | 0 | 0 | 0 |
| 300 | 0 | 0 | 0 | 0 |
| 310 | 0 | 0 | 0 | 0 |
| 320 | 0 | 0 | 0 | 0 |
| 330 | 0 | 0 | 0 | 0 |
| 340 | 0 | 0 | 0 | 0 |

Comparative Examples D (not Inventive)

Laminating layer

| Sublayers and composition | Weight per unit area [g/m²] | $T_A$ [°C.] | $T_B$ [°C.] | Width of peak A [°C.] | Width of peak B [°C.] |
|---|---|---|---|---|---|
| 20 wt % LDPE InnoPlus LD2420 from PTT, Thailand, 80 wt % HDPE Ineos HD6070FA from Ineos | 6.8 | 113 | 137 | 15 | 18 |
| 100 wt.-% LDPE 23L430 from Ineos | 11.95 | | | | |
| Blend: 60 wt % LDPE 23L430 from Ineos, 40 wt % mPE Affinity ® from Dow | 11.25 | | | | |

| Hot air temperature [°C.] | Leaked containers 0 to 1 h | Leaked containers 1 to 3 h | Leaked containers 3 to 24 h | Leaked containers 0 to 24 h |
|---|---|---|---|---|
| 280 | 1 | 2 | 2 | 5 |
| 290 | 1 | 1 | 1 | 3 |
| 300 | 0 | 1 | 1 | 2 |
| 310 | 0 | 0 | 1 | 1 |
| 320 | 0 | 0 | 0 | 0 |
| 330 | 0 | 0 | 0 | 0 |

Comparative Examples E (not Inventive)

| Sublayers and composition | Laminating layer | | | | |
|---|---|---|---|---|---|
| | Weight per unit area [g/m²] | $T_A$ [° C.] | $T_B$ [° C.] | Width of peak A [° C.] | Width of peak B [° C.] |
| 50 wt % LDPE Shell LD2420K from Shell Petrochemicals, GB, 50 wt % HDPE Ineos HD6070FA from Ineos | 6.8 | 114 | 137 | 15 | 18 |
| 100 wt % LDPE 23L430 from Ineos | 11.95 | | | | |
| Blend: 60 wt % LDPE 23L430 from Ineos, 40 wt % mPE Affinity ® from Dow | 11.25 | | | | |

| Hot air temperature [° C.] | Leaked containers 0 to 1 h | Leaked containers 1 to 3 h | Leaked containers 3 to 24 h | Leaked containers 0 to 24 h |
|---|---|---|---|---|
| 280 | 1 | 1 | 2 | 4 |
| 290 | 1 | 1 | 2 | 4 |
| 300 | 0 | 1 | 1 | 2 |
| 310 | 0 | 0 | 1 | 1 |
| 320 | 0 | 0 | 0 | 0 |
| 330 | 0 | 0 | 0 | 0 |

The sublayers of the laminating layer as specified in the tables above are subsidiary layers which together form the laminating layer. In the tables, the listing of the sublayers from top to bottom shows their sequence in the laminate from the exterior (carrier layer side) inwards (barrier layer side).

Evaluation

The measurement data above show that fewer leaking containers can be obtained with laminates according to the invention. More particularly, no leaking containers are obtained in a broader operating window for the hot air temperature for the sealing of the base region.

Unless indicated otherwise in the description or in the respective figure, the following is shown in each case, diagrammatically and not true to scale:

Figure 1:
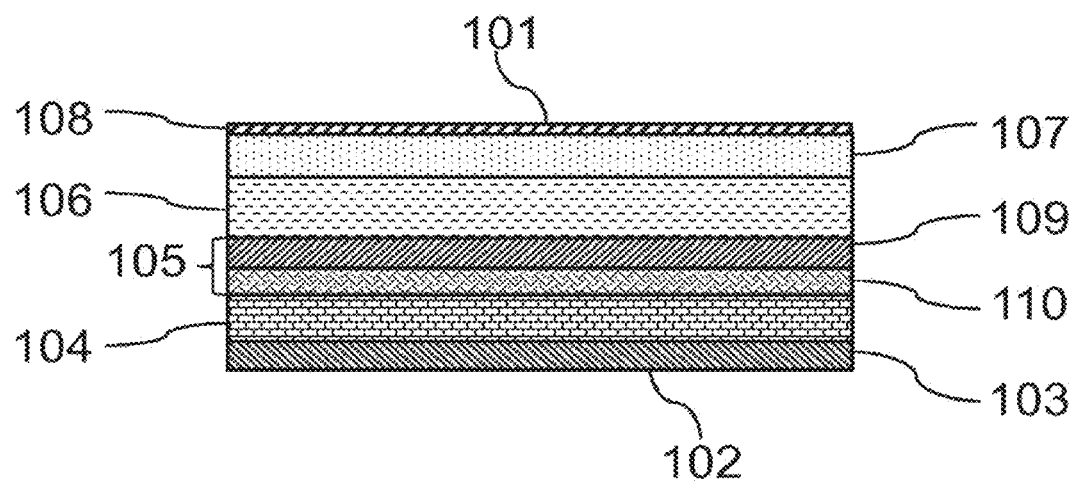
FIG. 1 shows a sheet-like composite of the invention in a cross section.
Figure 2:
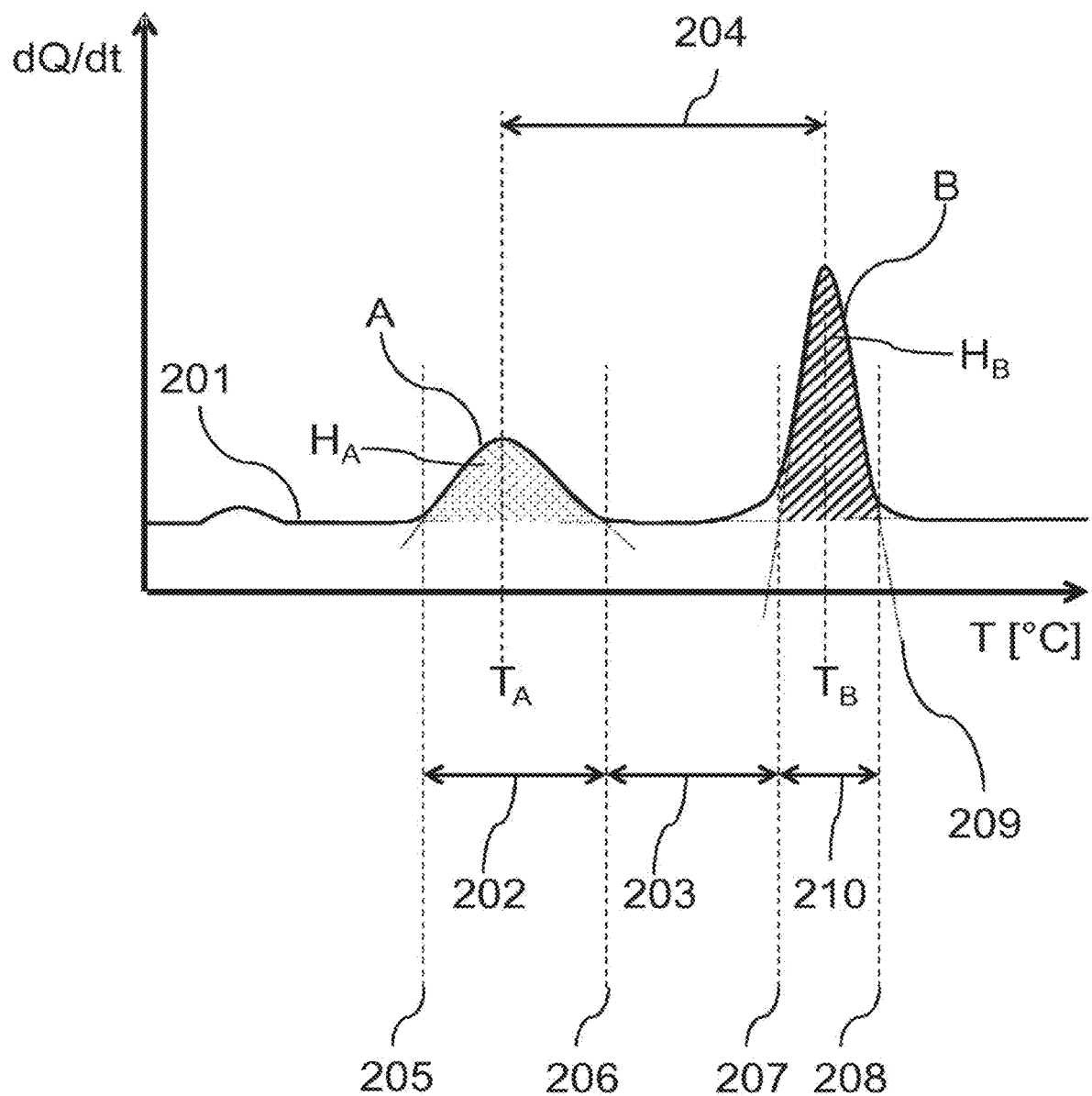
FIG. 2 shows a diagrammatic graph of a differential scanning calorimetry measurement of the polymeric intermediate layer of FIG. 1.

FIG. 1 shows a sheet-like composite 100 of the invention in a cross section. The sheet-like composite 100 includes as layers of a layer sequence, in a direction from an external side 101 of the sheet-like composite 100 to an internal side 102 of the sheet-like composite 100, an colour layer 108, a polymeric external layer 107 of LDPE, a carrier layer 106 of cardboard, a polymeric intermediate layer 105 as laminating layer, a barrier layer 104 of aluminium, and a polymeric internal layer 103. A graph 201 of a differential scanning calorimetry of the polymeric intermediate layer 105 is shown in FIG. 2. The polymeric intermediate layer 105 includes an HDPE in a fraction of 45 wt %, based on the total weight of the polymeric intermediate layer 105. Furthermore, the polymeric intermediate layer 105 consists of the following sublayers of a sublayer sequence, in a direction from the external side 101 to the internal side 102: a first intermediate layer 109 of 50 wt % HDPE and 50 wt % 23L430 from Ineos Köln GmbH, in each case based on the total weight of the first intermediate layer 109, and a further intermediate layer 110 of 100 wt % Novex® M21N430 from Ineos Köln GmbH, based on the total weight of the further intermediate layer 110. The polymeric internal layer 103 includes an HDPE in a fraction of 17 wt %, based on the total weight of the polymeric internal layer 103. Furthermore, the polymeric internal layer 103 consists of the following sublayers (not shown) of a sublayer sequence, in a direction from a side of the polymeric internal layer 103 that faces the barrier layer 104, to the internal side 102: a first internal layer of 75 wt % HDPE and 25 wt % LDPE, based in each case on the total weight of the first internal layer; a second internal layer of 100 wt % LDPE, based on the total weight of the second internal layer; and a third internal layer of a polymer blend, the polymer blend consisting of 30 wt % of an mPE and 70 wt % of an LDPE, based in each case on the total weight of the third internal layer. A graph of a differential scanning calorimetry measurement of the polymeric internal layer 103 has inventive peaks C and D, in particular with respect to the widths and enthalpies of fusion $H_C$ and $H_D$ thereof.

FIG. 2 shows a schematic graph 201 of a differential scanning calorimetry measurement of the polymeric intermediate layer 105 from FIG. 1. Plotted here are the heat flow dQ/dt against the temperature T in ° C. The graph includes a peak A at a temperature $T_A$ and a peak B at a temperature $T_B$. The temperature $T_B$ is more than the temperature $T_A$=105° C., with the difference between the two being 25° C. A width 210 of the peak B is smaller by 12° C. than a width 202 of the peak A. In this case the width 210 of the peak B is equal to a difference between an extrapolated end temperature 208 of the peak B and of an extrapolated start temperature 207 of the peak B. A width 202 of the peak A is equal to a difference between an extrapolated end temperature 206 of the peak A and an extrapolated start temperature 205 of the peak A. A difference 203 between the extrapolated start temperature 207 of the peak B and the extrapolated end temperature 206 of the peak A is 15° C. The extrapolated start and end temperatures 205-208 were determined by means of auxiliary lines 209. An enthalpy of fusion $H_A$ of peak A is 47 J/g. An enthalpy of fusion $H_B$ of peak is 23 J/g. Definitions of the terms used are found, as also indicated above, in DIN EN ISO 11357-1:2010-03.

Figure 3:
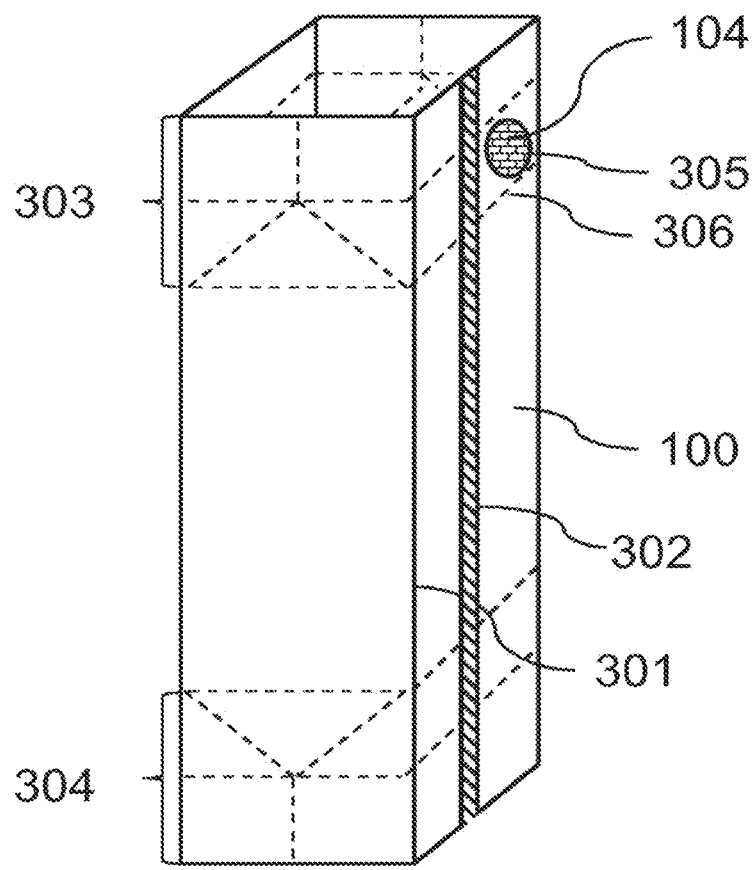
FIG. 3 shows a container precursor of the invention.

FIG. 3 shows a container precursor 300 of the invention. The container precursor 300 includes the sheet-like composite 100 of FIG. 1 with 4 folds 301. The sheet-like composite 100 is a blank for producing an individual closed container 400. The container precursor 200 is jacket-like and includes a longitudinal seam 302, in which a first longitudinal edge and a further longitudinal edge of the sheet-like composite 100 are sealed to one another. Further, the container precursor 300 includes a hole 305 in the carrier layer 106. The hole 305 is covered by the polymeric intermediate layer 105, the barrier layer 104 and the polymeric internal layer 103. By folding along grooves 306 and connecting of folding regions in a top region 303 and a base region 304 of the container precursor 300, a closed container 400 is obtainable. A closed container 400 of this kind is shown in FIG. 4.

Figure 4:
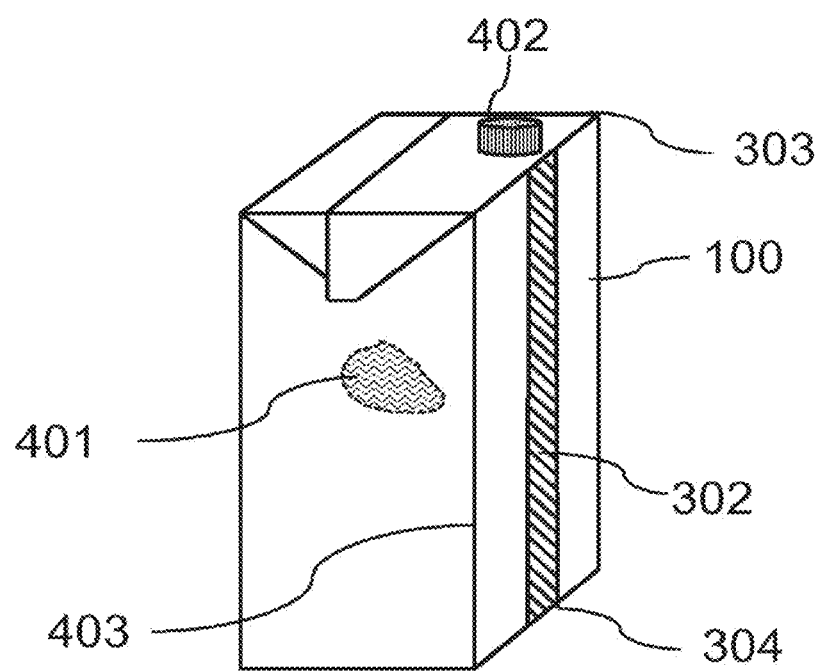
FIG. 4 shows a closed container of the invention.

FIG. 4 shows a closed container 400 of the invention. The closed container 400 is produced from the container precursor 300 according to FIG. 3. The closed container 400 contains a foodstuff 401 and has 12 edges 403. Further, the closed container 400 is joined to an opening aid 402, which covers the hole 305 on the external side 101 of the sheet-like composite 100. Here, the opening aid 402 includes a lid and a cutting tool connected to the lid in its interior.

Figure 5:
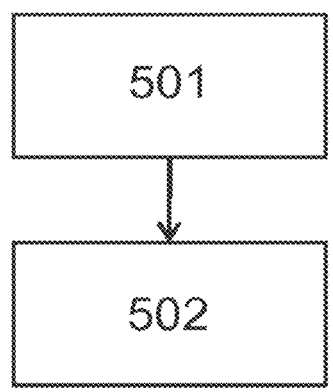
FIG. 5 shows a flow diagram of a process of the invention.

FIG. 5 shows a flow diagram of a process 500 of the invention for producing a sheet-like composite 100. The process 500 includes process steps a) 501 and b) 502. In process step a) 501, a carrier layer 106 of cardboard in roll form, a barrier layer 104 of aluminium in roll form, a first polymer composition and a further polymer composition are provided. In process step b) 502, the barrier layer 104 and the carrier layer 106 are joined to one another. This is done by laminating the barrier layer 104 to the carrier layer 106 using the first polymer composition and the further polymer composition as laminating agents. The laminating is performed as thermolaminating. In this operation, the carrier layer 106 is contacted with the first polymer composition, and the barrier layer 104 with the further polymer composition. Furthermore, the first polymer composition and the further polymer composition are contacted with one another. As a result of this procedure, a sheet-like composite 100 including as layers of a layer sequence, in a direction from an external side 101 of the sheet-like composite 100 to an internal side 102 of the sheet-like composite 100: the carrier layer 106, a first intermediate layer 109, formed from the cooled first polymer composition, a further intermediate layer 110, formed from the cooled further polymer composition, and the barrier layer 104. The first intermediate layer 109 and the further intermediate layer 110 together form a polymeric intermediate layer 105 of the invention. The first polymer composition consists to an extent of 70 wt % of an HDPE and 30 wt % of Novex® 23L430 from Ineos Köln GmbH, based in each case on the total weight of the first polymer composition. The further polymer composition consists to an extent of 100 wt % of Novex® M21N430 from Ineos Köln GmbH, based on the total weight of the further polymer composition.

Figure 6:
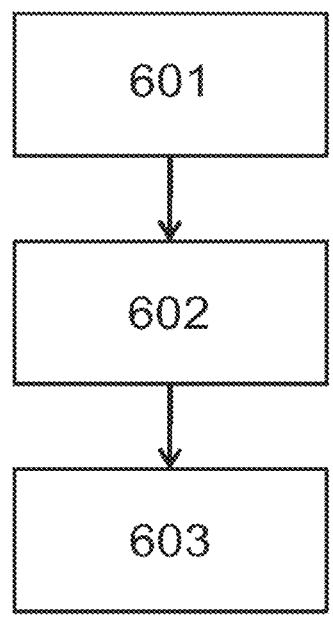
FIG. 6 shows a flow diagram of another process of the invention.

FIG. 6 shows a flow diagram of another process 600 of the invention for producing a container precursor 300. In a process step A. 601, the sheet-like composite 100 of FIG. 1 is provided. It includes a first longitudinal edge and a further longitudinal edge. In a process step B. 602, the sheet-like composite 100 is folded. In a process step C. 603, the first longitudinal edge and the further longitudinal edge are pressed onto one another and joined to one another by ultrasonic sealing. This produces a longitudinal seam 302. The container precursor 300 of FIG. 3 is produced according to the above description.

Figure 7:
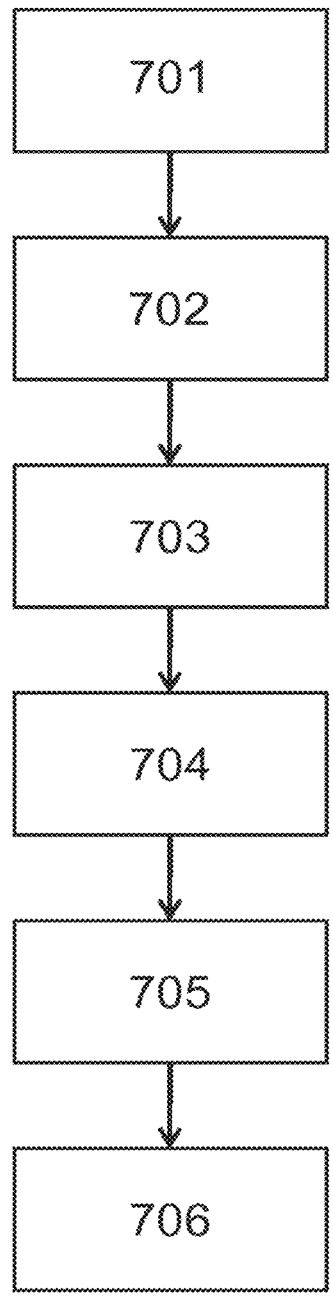
FIG. 7 shows a flow diagram of another process of the invention.

FIG. 7 shows a flow diagram of another process 700 of the invention for producing a closed container 400. In a process step a. 701, the container precursor 300 of FIG. 3 is provided. In a process step b. 702, a base region 304 of the container precursor 300 is formed by folding of the sheet-like composite 100. In a process step c. 703, the base region 304 is closed by sealing with hot air at a temperature of 300° C. In a process step d. 704, the container precursor 300 is filled with a foodstuff 401, and in a process step e. 705 the container precursor 300 is closed in a top region 303 by sealing, obtaining the closed container 400. In a process step f. 706, the closed container 400 is joined to an opening aid 402.

Figure 8:
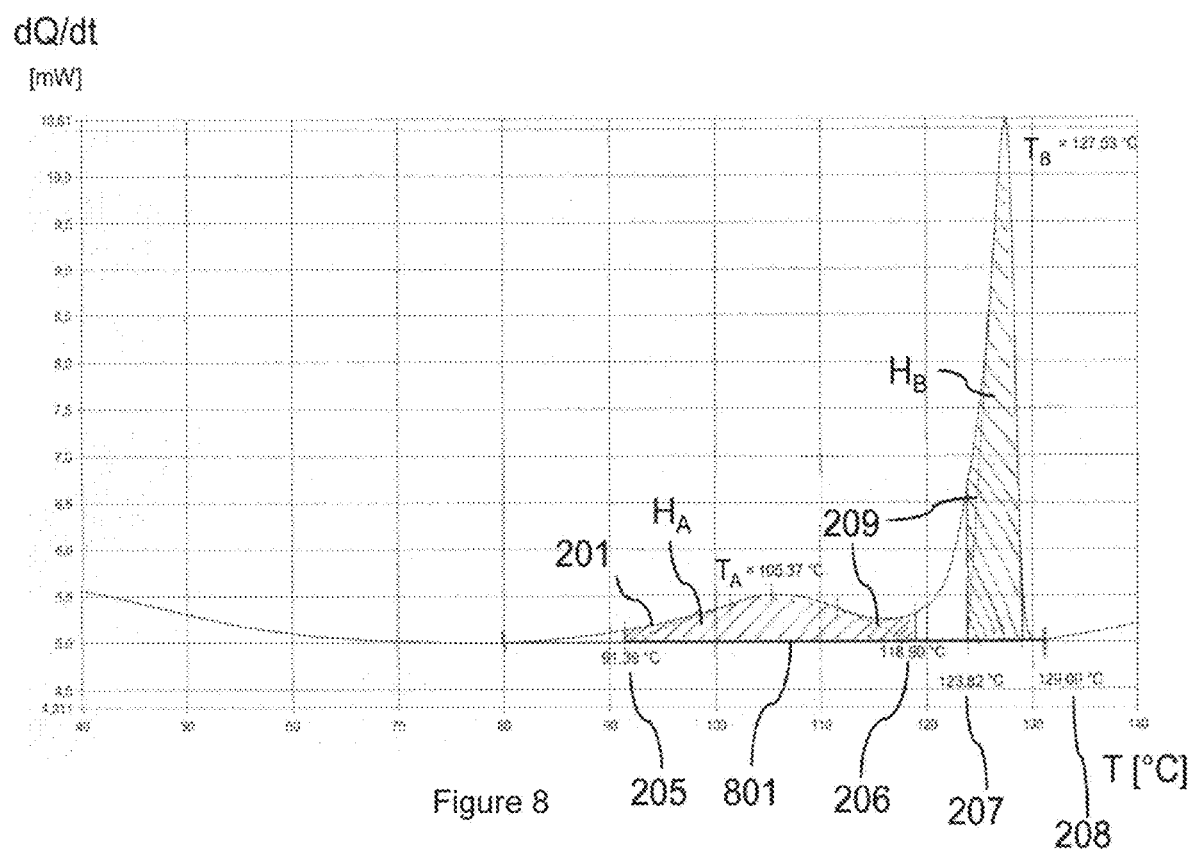
FIG. 8 shows a graph of a differential scanning calorimetry measurement of a polymeric intermediate layer of a sheet-like composite of the invention.

FIG. 8 shows a graph 201 of a differential scanning calorimetry measurement of a polymeric intermediate layer 105 of a sheet-like composite 100 of the invention. The sheet-like composite 100 includes as layers of a layer sequence, in a direction from an external side 101 of the sheet-like composite 100 to an internal side 102 of the sheet-like composite 100, an colour layer 108, a polymeric external layer 107 of LDPE, a carrier layer 106 of cardboard, the polymeric intermediate layer 105 as laminating layer, a barrier layer 104 of aluminium, and a polymeric internal layer 103. The polymeric intermediate layer 105 includes an HDPE in a fraction of 50 wt %, based on the total weight of the polymeric intermediate layer 105, and Novex® M21N430 from Ineos Köln GmbH in a fraction of 50 wt %, based on the total weight of the polymeric intermediate layer 105. The differential scanning calorimetry measurement was carried out as described in the measurement method above, more particularly with the stated heating rates, the hold time and the cooling rate. The graph 201 depicted comes from the measurement of the second heating rate. Plotted in FIG. 8 are the heat flow dQ/dt in mW against the temperature T in ° C. Also to be seen in FIG. 8 are a peak A at a temperature $T_A$=105.37° C. and a peak B at a temperature $T_B$=127.53° C., in each case above a virtual interpolated baseline 801. Peak A has an enthalpy of fusion $H_A$ and peak B an enthalpy of fusion $H_B$. Peak A is characterized by an extrapolated start temperature 205 of 91.39° C. and an extrapolated end temperature 206 of 118.90° C. Peak B is characterized by an extrapolated start temperature 207 of 123.82° C. and an extrapolated end temperature 208 of 129.00° C. For determining the extrapolated start temperatures 205 and 207 and the extrapolated end temperatures 207 and 208, auxiliary lines 209 are used as tangents to points of inflection of the respective peak, as described on page 11 of DIN EN ISO 11357-1:2010-03.

LIST OF REFERENCE NUMERALS 100 sheet-like composite of the invention
101 external side
102 internal side
103 polymeric internal layer
104 barrier layer
105 polymeric intermediate layer
106 carrier layer
107 polymeric external layer
108 colour layer
109 first intermediate layer
110 further intermediate layer
201 graph
202 width of peak A
203 difference between an extrapolated start temperature of peak B and an extrapolated end temperature of peak A
204 difference between the temperature $T_B$ and the temperature $T_A$
205 extrapolated start temperature of peak A
206 extrapolated end temperature of peak A
207 extrapolated start temperature of peak B
208 extrapolated end temperature of peak B
209 auxiliary line
210 width of peak B 300 container precursor of the invention
301 fold
302 longitudinal seam
303 top region
304 base region
305 hole
306 groove
400 closed container of the invention
401 foodstuff
402 opening aid
403 edge
500 process of the invention for producing a sheet-like composite
501 process step a)
502 process step b)
600 process of the invention for producing a container precursor
601 process step A.
602 process step B.
603 process step C.
700 process of the invention for producing a closed container
701 process step a.
702 process step b.
703 process step c.
704 process step d.
705 process step e.
706 process step f.
801 virtual interpolated baseline

The invention claimed is:

1. A laminate including as layers of a layer sequence, in a direction from an external side of the laminate to an internal side of the laminate,
   a) a polymeric external layer, wherein the polymeric external layer comprises a polyolefin,
   b) a carrier layer, wherein the carrier layer includes a material selected from the group consisting of cardboard, paperboard, paper, and a combination of at least two thereof;
   c) a polymeric intermediate layer, wherein the polymeric intermediate layer comprises a polyolefin, and
   d) a barrier layer,
   where a graph of differential scanning calorimetry of the polymeric intermediate layer includes a peak A at a temperature $T_A$ and a peak B at a temperature $T_B$,
   where the temperature $T_B$ is more than the temperature $T_A$,
   where a width of the peak B is less by at least 3° C. than a width of the peak A,
   where the polymeric intermediate layer comprises a first intermediate layer and a second intermediate layer, wherein the first intermediate layer comprises from 20-70 wt. % HDPE, based on the total weight of the first intermediate layer, and 30-80% wt. % of LDPE, based on the total weight of the first intermediate layer; and
   where the polyolefin in the polymeric intermediate layer does not include LLDPE;
   wherein the polyolefin in the polymeric external layer does not consist of a polyethylene prepared using a metallocene catalyst (mPE).

2. The laminate according to claim 1, where the temperature $T_A$ is at least 80° C.

3. The laminate according to claim 1, where the peak A is characterized by an enthalpy of fusion $H_A$,
   where the peak B is characterized by an enthalpy of fusion $H_B$,
   where a ratio of the enthalpy of fusion $H_A$ to the enthalpy of fusion $H_B$ is in a range from 1:4 to 1:0.3.

4. The laminate according to claim 1, where an absolute value of a difference between the temperature $T_B$ and the temperature $T_A$ is at least 10° C.

5. The laminate according to claim 1, where an absolute value of a difference between the temperature $T_B$ and the temperature $T_A$ is not more than 40° C.

6. The laminate according to claim 1, where an absolute value of a difference between an extrapolated start temperature of the peak B and an extrapolated end temperature of the peak A is in a range from 5 to 20° C.

7. A container precursor including the laminate according to claim 1.

8. The container precursor according to claim 7, where the laminate has at least 3 folds.

9. The container precursor according to claim 7, where the laminate includes a first longitudinal edge and a further longitudinal edge, the first longitudinal edge being joined to the further longitudinal edge forming a longitudinal seam of the container precursor.

10. A closed container comprising the laminate according to claim 1.

11. The closed container according to claim 10, where the laminate includes a first longitudinal edge and a further longitudinal edge, the first longitudinal edge being joined to the further longitudinal edge forming a longitudinal seam of the closed container.

12. The closed container according to claim 11, where the closed container contains a foodstuff.

13. The laminate according to claim 1, wherein the polymeric intermediate layer further comprises an adhesion promoter.

14. The laminate according to claim 13, wherein the adhesion promoter comprises a polyethylene-maleic anhydride graft polymer, an ethylene-acrylic acid copolymer, an ethylene-methacrylic acid copolymer, or a combination thereof.

15. The laminate according to claim 1, wherein the second intermediate layer comprises an adhesion promoter.

16. A laminate including as layers of a layer sequence, in a direction from an external side of the laminate to an internal side of the laminate,
   a) a polymeric external layer, wherein the polymeric external layer comprises a polyolefin
   b) a carrier layer,
   c) a polymeric intermediate layer, wherein the polymeric intermediate layer comprises a polyolefin, and
   d) a barrier layer,
   where a graph of differential scanning calorimetry of the polymeric intermediate layer includes a peak A at a temperature $T_A$ and a peak B at a temperature $T_B$,
   where the temperature $T_B$ is more than the temperature $T_A$,
   where a width of the peak B is less by at least 3° C. than a width of the peak A,
   wherein the polymeric intermediate layer comprises from 20-70 wt. % HDPE, based on the total weight of the intermediate layer, and 30-80% wt. % of LDPE, based on the total weight of the intermediate layer, where the polymeric intermediate layer does not include LLDPE;
   wherein the polyolefin in the polymeric external layer does not consist of a polyethylene prepared using a metallocene catalyst (mPE).

17. The laminate according to claim 1 or 16, where the polyolefin in the polymeric external layer does not include mPE.

18. The laminate according to claim 1 or 16, where the polymeric external layer consists of LDPE.

* * * * *